UNITED STATES PATENT OFFICE.

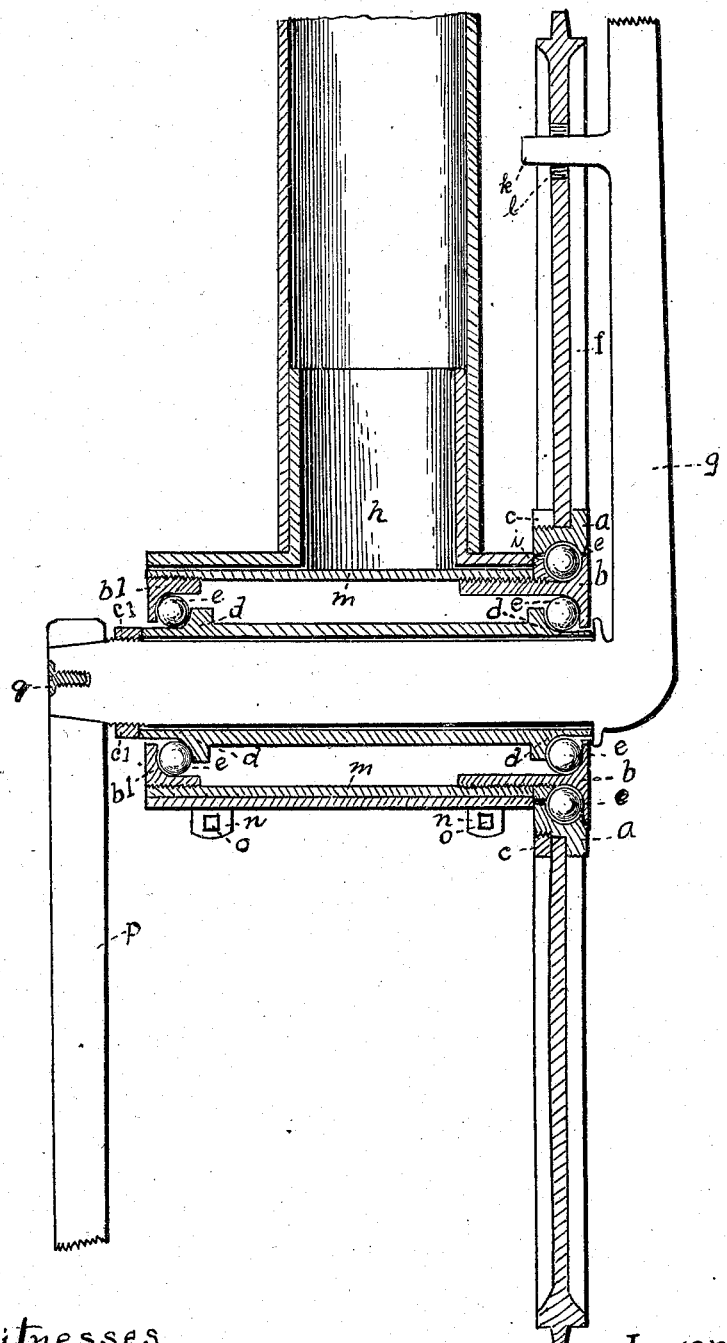

ARTHUR L. GIRARD, OF LINCOLN, NEBRASKA.

DOUBLE BEARING FOR BICYCLE SPROCKETS AND CRANK-SHAFTS.

No. 921,100.      Specification of Letters Patent.      Patented May 11, 1909.

Application filed August 31, 1908. Serial No. 451,112.

*To all whom it may concern:*

Be it known that I, ARTHUR L. GIRARD, a citizen of the United States, residing at Lincoln, in the county of Lancaster and State of Nebraska, have invented certain new and useful Improvements in Double Bearings for Bicycle - Sprockets and Crank - Shafts, of which the following is a specification sufficiently clear to enable those skilled in the art to which it appertains to make and use the same.

Its object is:—1. To produce separate sprocket and separate crankshaft bearings for bicycles which bearings will eliminate side draft from the sprocket, increase the distance a wheel will run without oiling and decrease accordingly the danger of accidents due to dry bearings. 2. To provide bicycle sprocket and crank shaft bearings in a direct line with the pull and which work together greatly decreasing the friction and increasing the wearing power and making the wheel an exceedingly easy runner. This purpose is attained in my invention by certain novel construction and combination of parts and materials which will be hereinafter described and claimed.

My invention is illustrated in the accompanying drawings:—

The figure represents a vertical, cross-sectional view (lengthwise the shaft) of my invention on bike frame.

Similar letters refer to similar parts.

I make a double cup, "$b$" having a cylindrical portion terminating at one end in an outer and an inner annular flange. I thread the outer side of the cylindrical portion of my double cup for the purpose of holding the collar bearing "$i$" and for the further purpose of attaching the double cup to the bicycle frame. I attach my double cup by screwing its threaded end into threads cut into the crank hanger to receive same, or by screwing the threaded end of the double cup into a sleeve, the sleeve being held in the crank hanger by lugs and pinch bolts underneath the bracket preferably. The inner, and annular side of each flange I shape to fit the bearing mediums so that the outer bearing is directly over the inner bearing and both working on the same plane. In connection with the inner bearing medium I use an ordinary cone bearing "$d$". In connection with the outer bearing medium I use the collar bearing "$i$" threaded to match the threads in the double cup and attached and adjusted thereby.

I make a track, or ball, race "$a$" to fit over the outer bearing mediums, for bearing mediums I prefer the ordinary balls, "$e$", "$e$", "$e$", "$e$", I make the outer part of the track, or ball, race "$a$" with an offset and a shoulder to receive the sprocket "$f$" and I thread the lower portion of the outer part of the track race and attach the sprocket-wheel thereon and against the shoulder portion thereof by means of the lock-nut "$c$" so as to make the sprocket line with the two sets of bearings, "$e$", "$e$". I provide a slot "$l$" in a spoke of the sprocket "$f$". I provide the crank "$g$" with a lug "$k$", the end of which lug passes loosely through the slot "$l$" in sprocket spoke, the lug "$k$" being shaped and positioned so as to permit radial and lateral motion in sprocket slot "$l$". I use a crank integral with a crank shaft "$g$", which crank shaft and crank is carried on the inner bearing mediums, my sprocket being carried on the outer set of bearing mediums, the set outside the double cup. Thus my sprocket and its bearings outside the double cup and my crank shaft bearings inside the double cup work on the same plane, each doing its own work. This feature is made possible and practical by means of my transmission of power to the sprocket through my sliding lug device. The slot "$l$" in the sprocket spoke I make longer than the width of the lug "$k$". The lug "$k$" is attached solidly to the crank arm "$g$" and positioned so as to pass through the slot "$l$" leaving space above and below the lug in said slot. This device renders it impossible to transmit a side pull to my sprocket and impossible for my shaft to ride on my sprocket wheel or for my sprocket wheel to ride on my shaft, enabling my construction to increase the life of a wheel, makes it an exceedingly easy runner, an ideal hill climber, increases the distance it will run without oiling, besides other incidental advantages all of which will be the more easily understood by an examination of the figure of the drawings, made a part of this specification.

Having thus described my invention, what I claim as new and desire to secure by Letters Patent, is:—

1. In bicycle gearing, a crank shaft provided with means of preventing endwise displacement, a crank hanger, a sprocket wheel provided with a slot in one of its spokes, a crank integral with said crank shaft and having a lug loosely fitting the said slot, a double cup with an outer and inner annular flange and having outer threads for engaging one end of the crank hanger and also for engaging a collar bearing, a ball race provided with an inner grooved surface to fit the bearing mediums of the sprocket bearings and provided with an outer surface fitting the central opening in said sprocket, one side of said outer surface being threaded, the other side formed into a projecting shoulder, a threaded nut lock fitting threads on said ball race, a threaded collar bearing fitting threads on the double cup, a set of sprocket bearing mediums positioned outside the double cup in line with said sprocket, and a set of crank shaft bearing mediums positioned inside the double cup in line with said sprocket bearing mediums and sprocket, all substantially as described.

2. In a bicycle gearing, in combination, a crank hanger, a sprocket wheel provided with a slot in one of its spokes, a crank shaft, a crank integral with said crank shaft and having a lug loosely fitting the said slot, a double cup with an outer and an inner annular flange and having outer threads for engaging one end of the crank hanger and also for engaging a collar bearing, a ball race provided with an inner grooved surface to fit the bearing mediums of the sprocket bearings and provided with an outer surface fitting the central opening in said sprocket, one side of said outer surface being threaded, the other side being formed into a projecting shoulder, a threaded nut lock fitting threads on said ball race, a threaded collar bearing fitting threads on said double cup, a set of sprocket bearing mediums positioned outside the double cup in line with said sprocket, and a set of crank shaft bearing mediums positioned inside the double cup in line with the sprocket bearing mediums and sprocket, all substantially as described.

3. In bicycle gearing, in combination, a crank shaft, a crank hanger, a sprocket wheel provided with a slot in one of its spokes, a crank integral with said crank shaft and having a lug loosely fitting the said slot and projecting through the slot, leaving space therein above and below the lug, slidably connecting the crank and sprocket, a double cup comprising a cylindrical portion terminating at one end in an outer annular flange and an inner annular flange the cylindrical portion having outer threads for engaging one end of the crank hanger and for engaging a collar bearing, a ball race having an inner grooved surface to fit the sprocket bearing mediums and an outer surface fitting the inner opening in said sprocket, one side of said outer surface being threaded the other side having an annular shoulder projecting therefrom, a threaded nut lock fitting said threaded outer surface, a threaded collar bearing fitting threads on said double cup, a set of sprocket bearing mediums positioned outside the double cup in line with said sprocket, and a set of crank shaft bearing mediums positioned inside the double cup in line and working on the same plane with the sprocket bearing mediums and sprocket, the said shaft being provided with a cone bearing, all substantially as described.

In testimony whereof, I have signed my name to this specification in the presence of two subscribing witnesses.

ARTHUR L. GIRARD.

Witnesses:
H. F. BISHOP,
MAY E. HOLLAND.